(12) United States Patent
Hori et al.

(10) Patent No.: US 10,549,677 B2
(45) Date of Patent: Feb. 4, 2020

(54) VEHICLE SYSTEM, VEHICLE, AND INFORMATION PROCESSING DEVICE

(71) Applicant: TOYOTA JIDOSHA KABUSHIKI KAISHA, Toyota-shi, Aichi-ken (JP)

(72) Inventors: Takashige Hori, Aisai (JP); Makoto Akahane, Nagoya (JP); Ken Ishikawa, Nagakute (JP); Masatoshi Takahara, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/182,195

(22) Filed: Nov. 6, 2018

(65) Prior Publication Data

US 2019/0176685 A1    Jun. 13, 2019

(30) Foreign Application Priority Data

Dec. 12, 2017   (JP) .................................. 2017-237570

(51) Int. Cl.
*B60Q 1/14*     (2006.01)
*G06N 20/00*    (2019.01)

(52) U.S. Cl.
CPC ............... *B60Q 1/14* (2013.01); *G06N 20/00* (2019.01)

(58) Field of Classification Search
CPC .................................. B60Q 1/14; G06N 20/00
USPC ......................................................... 315/82
See application file for complete search history.

(56) References Cited

U.S. PATENT DOCUMENTS

| | | | | |
|---|---|---|---|---|
| 2005/0169000 A1* | 8/2005 | Hasegawa | ............... | B60Q 1/085 362/466 |
| 2007/0268159 A1* | 11/2007 | Futamura | ............... | B60Q 1/143 340/933 |
| 2010/0265330 A1* | 10/2010 | Li | ............... | B60Q 1/143 348/148 |
| 2017/0256167 A1* | 9/2017 | Kim | ................. | G08G 1/096783 |
| 2017/0284824 A1* | 10/2017 | Korzunov | .......... | G01C 21/3697 |
| 2018/0154820 A1* | 6/2018 | Awano | ................ | B60Q 1/0076 |
| 2019/0031085 A1* | 1/2019 | Ba | ...................... | G06K 9/00604 |

FOREIGN PATENT DOCUMENTS

| | | |
|---|---|---|
| JP | H08-040139 A | 2/1996 |
| JP | 2008-056056 A | 3/2008 |
| JP | 2017-081388 A | 5/2017 |

* cited by examiner

*Primary Examiner* — Don P Le
(74) *Attorney, Agent, or Firm* — Hunton Andrews Kurth LLP

(57) ABSTRACT

A vehicle system includes an information processing device and a vehicle. The vehicle includes: a detection unit configured to detect an illuminance change; an acquisition unit configured to acquire position information; a first sending unit configured to send, to the information processing device, (i) illuminance change position information and (ii) traveling information; a first receiving unit configured to receive a turn-on condition from the information processing device; and a turn-on unit configured to turn on a headlight according to the traveling information and the turn-on condition. The information processing device includes a learning unit configured to learn, as the turn-on condition, traveling content of the vehicle before the vehicle reaches the position where the illuminance change is detected, by using the travelling information, and a second sending unit configured to send the turn-on condition to the vehicle.

11 Claims, 7 Drawing Sheets

VEHICLE SYSTEM, VEHICLE, AND INFORMATION PROCESSING DEVICE

INCORPORATION BY REFERENCE

The disclosure of Japanese Patent Application No. 2017-237570 filed on Dec. 12, 2017 including the specification, drawings and abstract is incorporated herein by reference in its entirety.

BACKGROUND

1. Technical Field

The present disclosure relates to a vehicle system, a vehicle, and an information processing device.

2. Description of Related Art

Vehicles, such as automobiles, equipped with the automatic headlight turn-off (AUTO) function are widely used. Such a vehicle automatically turns on or off the headlights when a change in illuminance is detected.

A method for automatically turning on or off the headlights of a vehicle is described, for example, in Japanese Patent Application Publication No. 2008-056056 (JP 2008-056056 A). Japanese Patent Application Publication No. 2008-056056 (JP 2008-056056 A) discloses a technique for automatically turning on or off the main headlight lamps of a vehicle according to the illuminance around the vehicle. This disclosure describes that the main headlight lamps are turned on when the illuminance around a vehicle is lower than the predetermined value and, at the same time, the vehicle speed is equal to or higher than the threshold and, when the vehicle speed is lower than the threshold, the main headlight lamps are turned off. This disclosure also describes that, even when the vehicle speed is lower than the threshold and, therefore, the headlights should be automatically turned off, the headlights are not automatically turned off when the vehicle is present in a place where it is necessary for the user to always turn on the headlights.

SUMMARY

The method disclosed in Japanese Patent Application Publication No. 2008-056056 (JP 2008-056056 A) is characterized in that the headlights are turned on or off based on the vehicle speed and the vehicle position. According to this method, when a vehicle enters a multi-level parking garage or a tunnel, the headlights are turned on after a constant illuminance continues for a predetermined time after entering the multi-level parking garage or the tunnel. Therefore, for a few seconds after entering a dark place from a light place, the vehicle travels with the headlights turned off even though the illuminance is low (dark), meaning that the vehicle must travel with poor visibility. Thus, it is preferable to turn on the headlights before entering a multi-level parking garage or a tunnel, that is, before the illuminance changes. However, this is not taken into consideration in Japanese Patent Application Publication No. 2008-056056 (JP 2008-056056 A). Furthermore, consider a case where a vehicle turns right at some point on the road to enter a multilevel parking garage. In this case, one possible method to avoid traveling in a dark place is to require the vehicle to always turn on the headlights at that point on the road. A disadvantage of this method is that the vehicle must turn on the headlights even when the vehicle does not enter the multi-level parking garage but continues to travel straight on.

The present disclosure provides a vehicle system, a vehicle, and an information processing device capable of automatically and suitably turning on the headlights.

A first aspect of the disclosure provides a vehicle system. The vehicle system includes an information processing device and a vehicle. The vehicle includes: a detection unit configured to detect an illuminance change on a periphery of the vehicle; an acquisition unit configured to acquire position information of the vehicle; a first sending unit configured to send, to the information processing device, (i) illuminance change position information and (ii) traveling information when a headlight of the vehicle has been turned on for a predetermined time after the illuminance change, the illuminance change position information being information on a position where the illuminance change is detected, the traveling information indicating a traveling state of the vehicle before the vehicle reaches the position where the illuminance change is detected; a first receiving unit configured to receive a turn-on condition from the information processing device, the turn-on condition being a condition for turning on the headlight; and a turn-on unit configured to turn on the headlight according to the traveling information and the turn-on condition, wherein the information processing device includes a second receiving unit configured to receive, from the vehicle, (i) the illuminance change position information and (ii) the traveling information, a learning unit configured to learn, as the turn-on condition, traveling content of the vehicle before the vehicle reaches the position where the illuminance change is detected, by using the travelling information, the traveling information being associated with the position where the illuminance change is detected within a predetermined range and a second sending unit configured to send the turn-on condition to the vehicle.

In the first aspect, the first sending unit may be configured to send, to the information processing device, the traveling information on a predetermined-distance range before the position where the illuminance change is detected, the traveling information being associated with the illuminance change position information.

A second aspect of the disclosure provides a vehicle. The vehicle includes: a detection unit configured to detect an illuminance change on a periphery of the vehicle; an acquisition unit configured to acquire position information of the vehicle; a sending unit configured to send, to an information processing device, (i) illuminance change position information and (ii) traveling information when a headlight of the vehicle has been turned on for a predetermined time after the illuminance change, the illuminance change position information being information on a position where the illuminance change is detected, the traveling information indicating a traveling state of the vehicle before the vehicle reaches the position where the illuminance change is detected; a receiving unit configured to receive a turn-on condition from the information processing device, the turn-on condition being a condition for turning on the headlight; and a turn-on unit configured to turn on the headlight according to the traveling information and the turn-on condition.

In the second aspect, the sending unit may be configured to send, to the information processing device, the traveling information on a predetermined-distance range before the position where the illuminance change is detected, the traveling information being associated with the illuminance change position information.

A third aspect of the disclosure provides an information processing device. The information processing device includes: a receiving unit configured to receive, from a vehicle, (i) illuminance change position information and (ii)

traveling information of the vehicle, the illuminance change position information being information on a position where an illuminance change on a periphery of the vehicle is detected, the traveling information indicating a traveling state of the vehicle before the vehicle reaches the position where the illuminance change is detected; a learning unit configured to learn, as a turn-on condition, traveling content before the vehicle reaches the position where the illuminance change is detected, by using the travelling information, the turn-on condition being a condition for the vehicle to turn on a headlight of the vehicle, the traveling information being associated with the position where the illuminance change is detected within a predetermined range; and a sending unit configured to send the turn-on condition to the vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
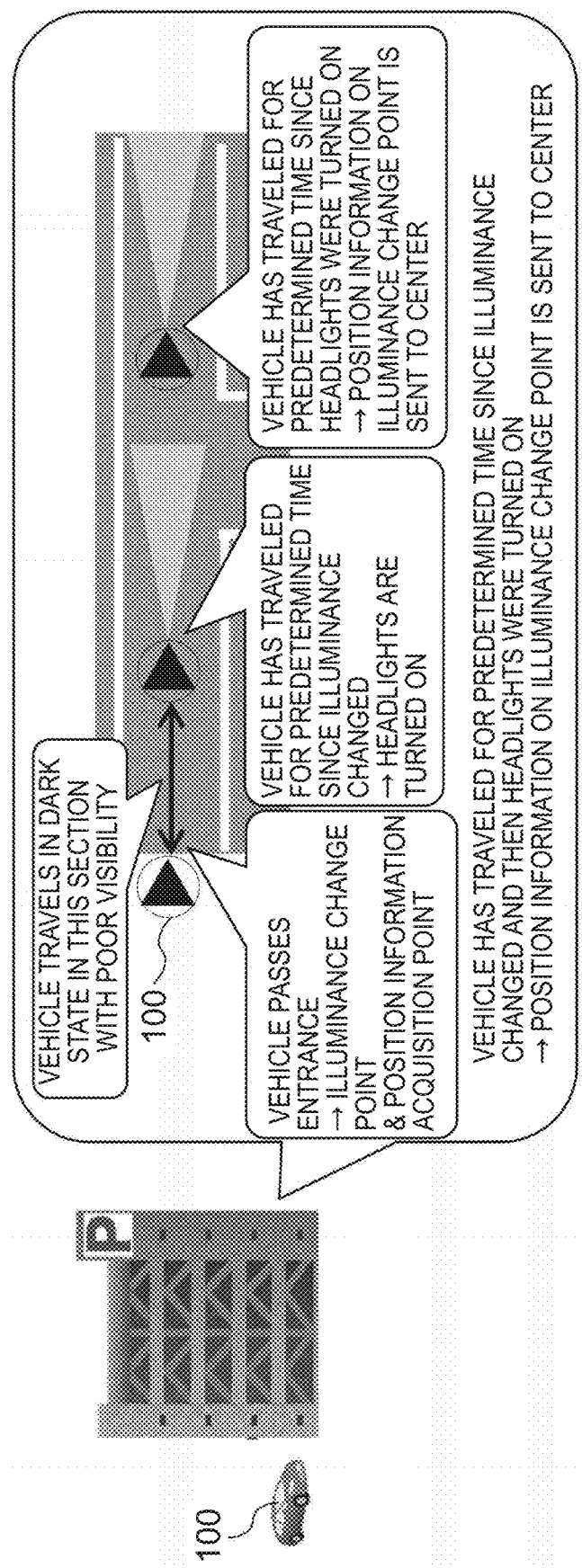
FIG. 1 is a diagram showing an operation of a vehicle system according to an embodiment.

An embodiment of the present disclosure will be described in detail below with reference to the drawings. It should be noted that the embodiment described below is exemplary only and that there is no intention to exclude the application of various modifications and techniques not explicitly described below. That is, the present disclosure can be implemented by various modifications without departing from the spirit of the disclosure. In addition, in the description of the drawings below, the same or similar components are denoted by the same or similar reference numerals. The drawings are schematic and do not necessarily correspond to actual dimensions, ratios, and so on.

There may be differences in dimensions and ratios between the drawings.

[Embodiment]

[1 Overall Configuration]

Figure 2:
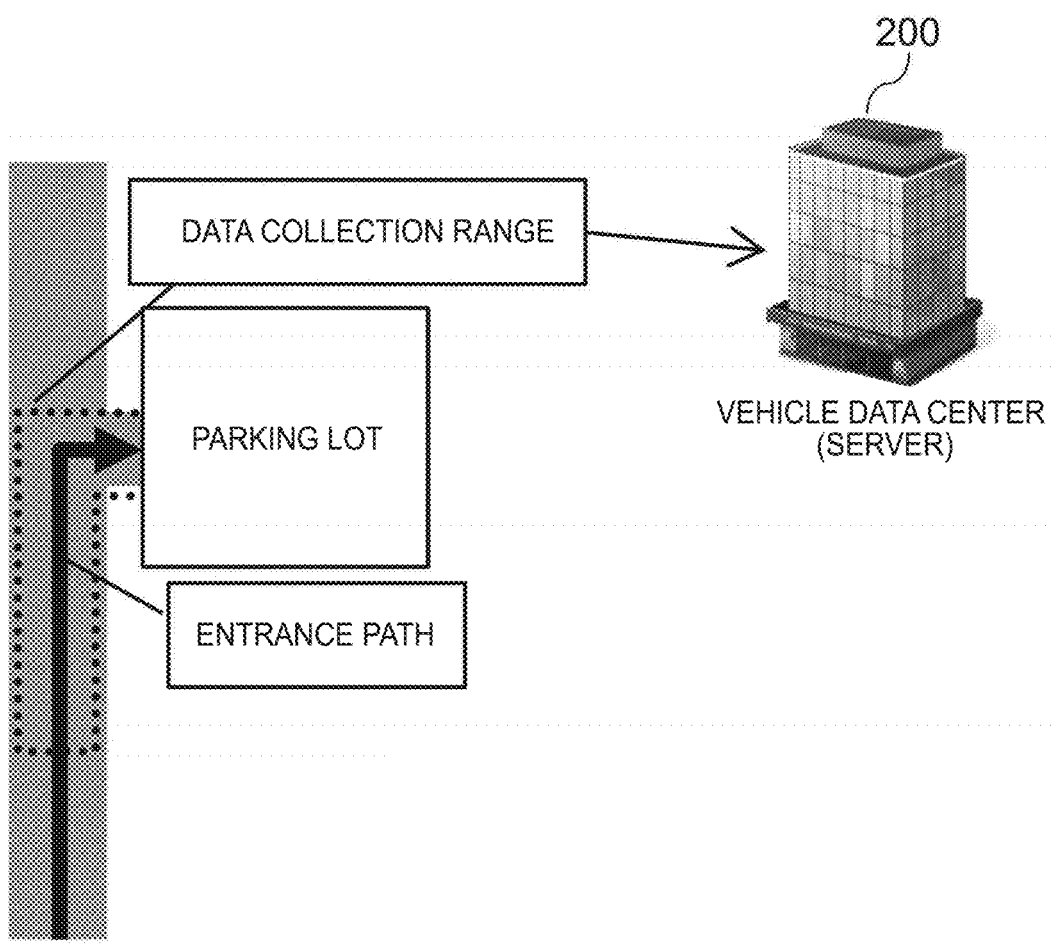
FIG. 2 is a diagram showing an operation of the vehicle system according to the embodiment.

The operation of a vehicle system 1 according to this embodiment will be described with reference to FIG. 1 and FIG. 2. First, referring to FIG. 1, the processing that is performed when a vehicle 100 enters an indoor parking lot with the automatic turn-on function (AUTO function) enabled. Note that, in the processing shown in FIG. 1, the vehicle 100 has not yet learned the headlight automatic turn-on function (AUTO function).

When the vehicle 100 enters the indoor parking lot, the illuminance changes to a luminance equal to or lower than a predetermined threshold (that is, the illuminance around the vehicle 100 is reduced; in the description below, the state in which the illuminance is equal to or lower than the threshold is referred to as a "dark state", and the state in which the illuminance is higher than the threshold is referred to as a "light state"). At that time, the vehicle 100 acquires the current position information on the host vehicle but does not turn on the headlights. When the vehicle has traveled in the dark state for a predetermined time (or a predetermined distance) after the illuminance changed, the vehicle 100 turns on the headlights. That is, for a predetermined time (or for a predetermined distance) after the illuminance is reduced, the vehicle 100 has to travel in the dark state in which the headlights are not turned on.

One possible method to prevent traveling in such a dark state is that the vehicle system always requests the vehicle 100 to turn on the headlights in advance before the vehicle 100 enters the range within a predetermined distance from the illuminance change point. However, there is a case, such as the one shown in FIG. 2, in which the vehicle 100 traveling on a road, where the can travel straight ahead, turns right to enter the multilevel parking garage that is an illuminance change point. In this case, even if the vehicle 100 is near the illuminance change point, whether to turn on the headlights depends on whether the vehicle 100 will travel straight or will turn right.

To address this problem, the vehicle system 1 in this embodiment learns a traveling condition for the point before an illuminance change point, where it is necessary to turn on the headlights, so that the headlights can be turned on before the illuminance change point. To enable the vehicle system 1 to learn a traveling condition, the vehicle 100 that has traveled with the headlights on for a predetermined time after turning on the headlights sends the following information to the vehicle data center (server 200): the position information on the illuminance change point and the traveling information on the state before the illuminance change point (that is, the state before the vehicle 100 enters an indoor parking lot) (See FIG. 2). The data center (the server 200) learns from many pieces of traveling information related to the same illuminance change point such as that described above and, based on the received information, learns what traveling conditions are present in a range near the illuminance change point before the vehicle 100 actually reaches the illuminance change point where the headlights should be turned on.

In this case, the traveling information, sent from the vehicle 100 to the vehicle data center (server 200), is the traveling information on the predetermined-distance range before the illuminance change point. For example, the traveling information is the information on the vehicle 100 indicated by the "data collection range" in FIG. 2. The traveling information may include the information on the coordinates, travel link ID, matching state, time, distance from the illuminance change point, vehicle speed, yaw rate, and vertical gravitational acceleration (G) information.

After leaning the traveling content (in the description below, also referred to as a "turn-on condition") about a range near the illuminance change point where headlights should be turned on, the server 200 sends the turn-on condition, which is the learning result, to the vehicle 100. After receiving the learning result, the vehicle 100 automatically turns on the headlights if the traveling information on the host vehicle satisfies the turn-on condition. This allows the headlights to be turned on immediately before the vehicle 100 enters a multilevel parking garage, for example, when the vehicle 100 traveling on the roadway turns right in FIG. 2.

[2 Functional Configuration]

Figure 3:
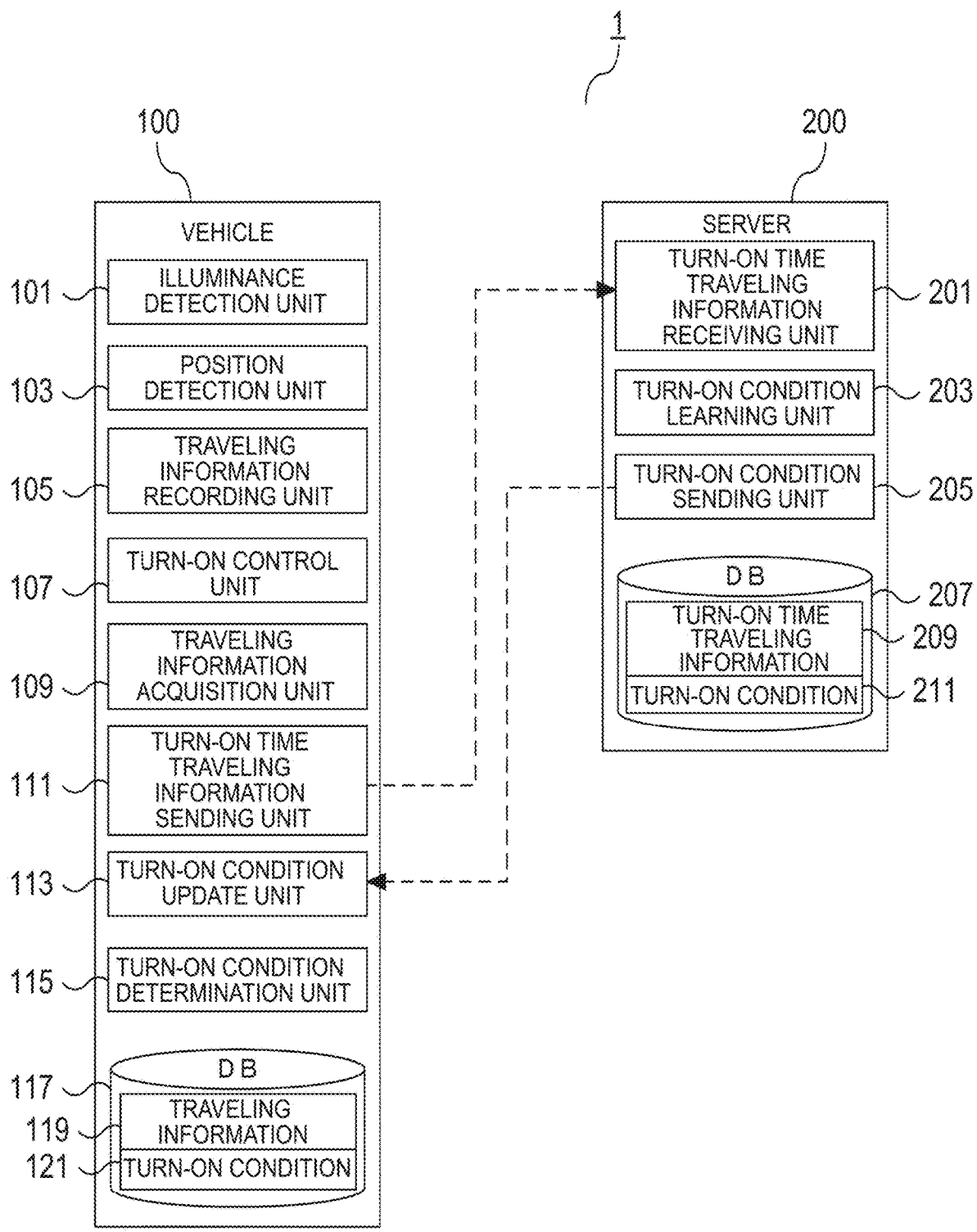
FIG. 3 is a diagram showing a functional configuration of the vehicle system according to the embodiment.

Next, a functional configuration of the vehicle system 1 according to this embodiment will be described with reference to FIG. 3. The vehicle system 1 includes the vehicle 100 and the server 200 as described above. The vehicle 100 and the server 200 can communicate with each other via a network (not shown) such as the Internet or a public telephone network.

[2.1 Vehicle 100]

The vehicle 100 is an automobile or a motorcycle. As described above, the vehicle 100 can communicate with the server 200. The vehicle 100 includes an illuminance detection unit 101, a position detection unit 103, a traveling information recording unit 105, a turn-on control unit 107, a traveling information acquisition unit 109, a turn-on time traveling information sending unit 111, a turn-on condition update unit 113, a turn-on condition determination unit 115, and a database (DB) 117.

The illuminance detection unit 101 detects the illuminance around the vehicle 100 based on the illuminance sensor mounted in the vehicle 100. By detecting the illuminance, the illuminance detection unit 101 can determine whether the surroundings of the vehicle 100 are dark or light. The illuminance detection unit 101 can also detect a change in illuminance, that is, whether the surroundings have changed from dark to light or from light to dark.

The position detection unit 103 acquires the position information (latitude/longitude information, coordinate information) on the host vehicle by receiving the signals from the Global Positioning System (GPS) or Wi-Fi or by collecting the traveling information while traveling. After the vehicle 100 is started, the position detection unit 103 regularly acquires the position information for use in the processing by the so-called the car navigation system. In addition, when the illuminance detection unit 101 detects a change in illuminance as described above (in particular, a change from light to dark), the position detection unit 103 detects the position information on the vehicle 100 corresponding to the illuminance change point.

The traveling information recording unit 105 serially records the traveling state of the host vehicle in the DB 117 as traveling information 119. As described above, the traveling information 119 may include the information on the coordinates, travel link ID, matching state, time, distance from the illuminance change point, vehicle speed, yaw rate, and vertical gravitational acceleration (G) information.

The turn-on control unit 107 turns on the lights (headlights) according to the determination result of a turn-on condition 121, determined by the turn-on condition determination unit 115, when the automatic turn-on function is enabled. In the initial state, the turn-on control unit 107 turns on the lights if the turn-on condition determination unit 115 determines that the dark state has continued for a predetermined period (a predetermined time or predetermined distance) since the illuminance detection unit 101 detected that the illuminance changed from light to dark. In addition, when the turn-on condition 121 for an area in the neighborhood of the current position of the vehicle 100, detected by the position detection unit 103, is registered in the DB 117, the turn-on control unit 107 turns on the lights if it is determined by the turn-on condition determination unit 115 that traveling content of the host vehicle in the most recent predetermined period satisfies the turn-on condition that is set in the turn-on condition 121.

The traveling information acquisition unit 109 reads the traveling information 119 recorded in the DB 117. In particular, when the illuminance detection unit 101 detected the illuminance change from light to dark, the vehicle 100 traveled for a predetermined time and, after that, the turn-on control unit 107 turned on the headlights, the traveling information acquisition unit 109 reads from the DB 117 the traveling information 119 on a predetermined distance before the illuminance change point. The turn-on time traveling information sending unit 111 sends the traveling information 119 that was read from the DB 117 by the traveling information acquisition unit 109 and is the information on the predetermined-distance range before the illuminance change point, together with the position information on the illuminance change point, to the server 200.

Upon receiving a new turn-on condition 121 from the server 200, the turn-on condition update unit 113 records the received turn-on condition 121 in the DB 117. Recording the new turn-on condition 121 in the DB 117 in this way updates the turn-on condition 121, thus allowing the turn-on control unit 107 to turn on the lights (headlights) according to the new turn-on condition 121.

The turn-on condition determination unit 115 determines whether the host vehicle state (such as the most recent traveling information 119 registered in the DB 117, the illuminance around the host vehicle detected by the illuminance detection unit 101, and the current position of the host vehicle detected by the position detection unit 103) satisfies the turn-on condition 121 registered in the DB 117 and then outputs the determination result to the turn-on control unit 107. More specifically, the turn-on condition determination unit 115 determines whether the host vehicle state satisfies the turn-on conditions 121, for example, the turn-on condition 121 that the headlights are turned on if the dark state has continued for a predetermined time since the illuminance changed from light to dark, and the turn-on condition 121 that the lights are turned on if a right/left turn during traveling is detected on a road in the neighborhood of a predetermined illuminance change point, and so on.

[2.2 Server 200]

The server 200 is an information processing device that can communicate with one or more vehicles 100. The server 200 includes a turn-on time traveling information receiving unit 201, a turn-on condition learning unit 203, a turn-on condition sending unit 205, and a database (DB) 207.

The turn-on time traveling information receiving unit 201 receives the following information from the vehicle 100: the information on an illuminance change point at which the headlights were turned on and its associated traveling information 119 of the vehicle 100 on a predetermined-distance range before the illuminance change point. The received information is recorded in the DB 207 as turn-on time traveling information 209.

In other words, the turn-on time traveling information receiving unit 201 receives the turn-on time traveling information 209. The turn-on time traveling information 209 includes the position information on an illuminance change point when the vehicle 100 turned on the headlights and the traveling information 119 on the vehicle 100 collected before reaching the illuminance change point. The received information is stored in the DB 207.

The turn-on condition learning unit 203 generates a turn-on condition 211. If the turn-on time traveling information 209, stored in the DB 207, includes more than a certain number of pieces of data collected for the same illuminance change point, the turn-on condition learning unit 203 uses the collected data as the learning data for learning. As a result of this learning, the turn-on condition learning unit 203 generates the turn-on condition 211 for the headlights to be turned on in advance for that illuminance change point. The turn-on condition 211 generated in this way indicates that under what traveling state the vehicle 100 will reach an illuminance change point where the headlights need to be turned on. The turn-on condition learning unit 203 may use any learning method. The turn-on condition 211 generated by the turn-on condition learning unit 203 is stored in the DB 207 for each illuminance change point.

The turn-on condition sending unit 205 sends the turn-on condition 211 learned by the turn-on condition learning unit 203, together with the position information on the illuminance change point, to the vehicle 100 at an appropriate time. By sending the turn-on condition 211 in this way, the turn-on condition 121, registered in the DB 117 of the vehicle 100, is updated.

[3 Processing Flow]

Figure 4:
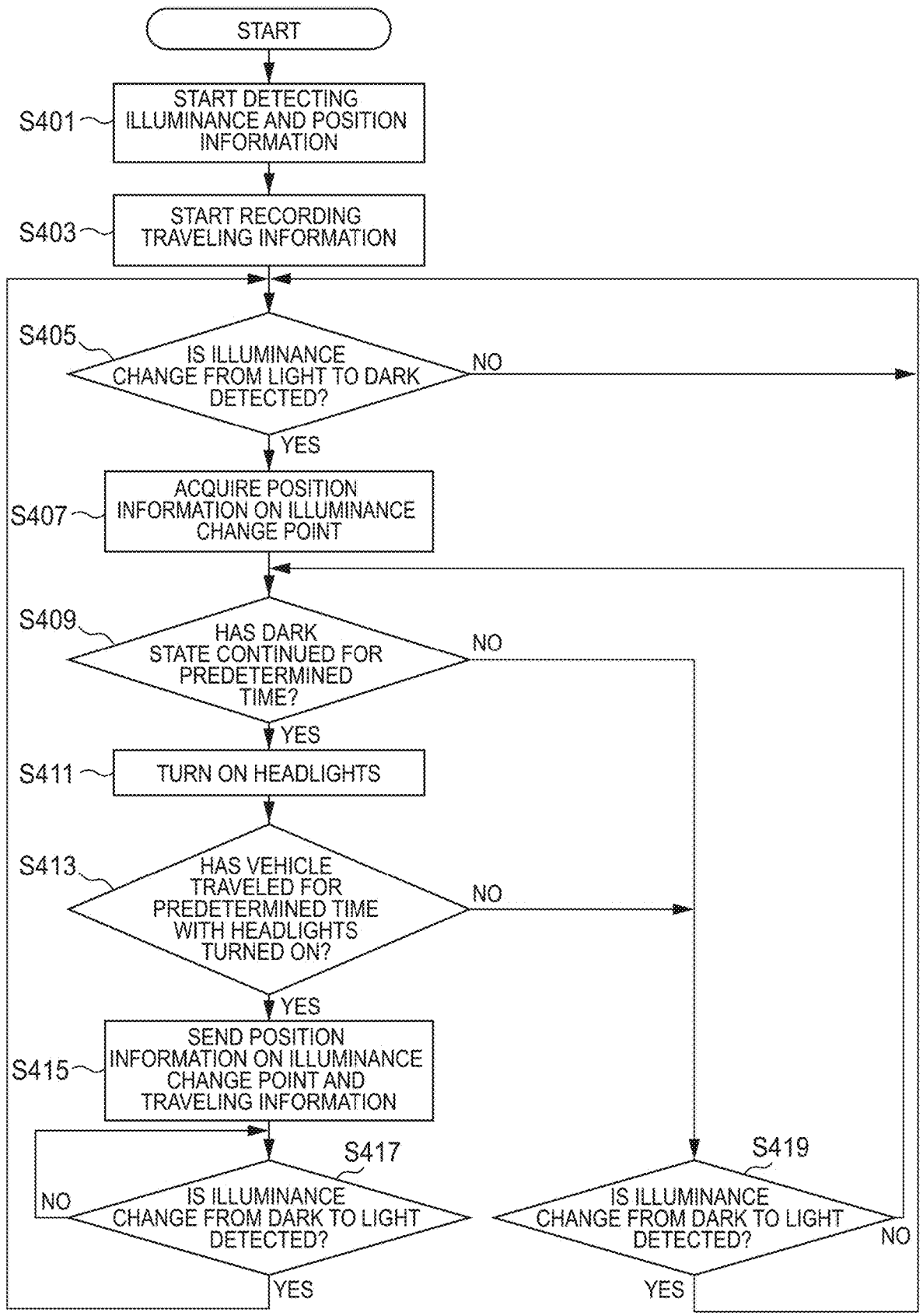
FIG. 4 is a flowchart showing a processing flow of the vehicle shown in FIG. 3.
Figure 5:
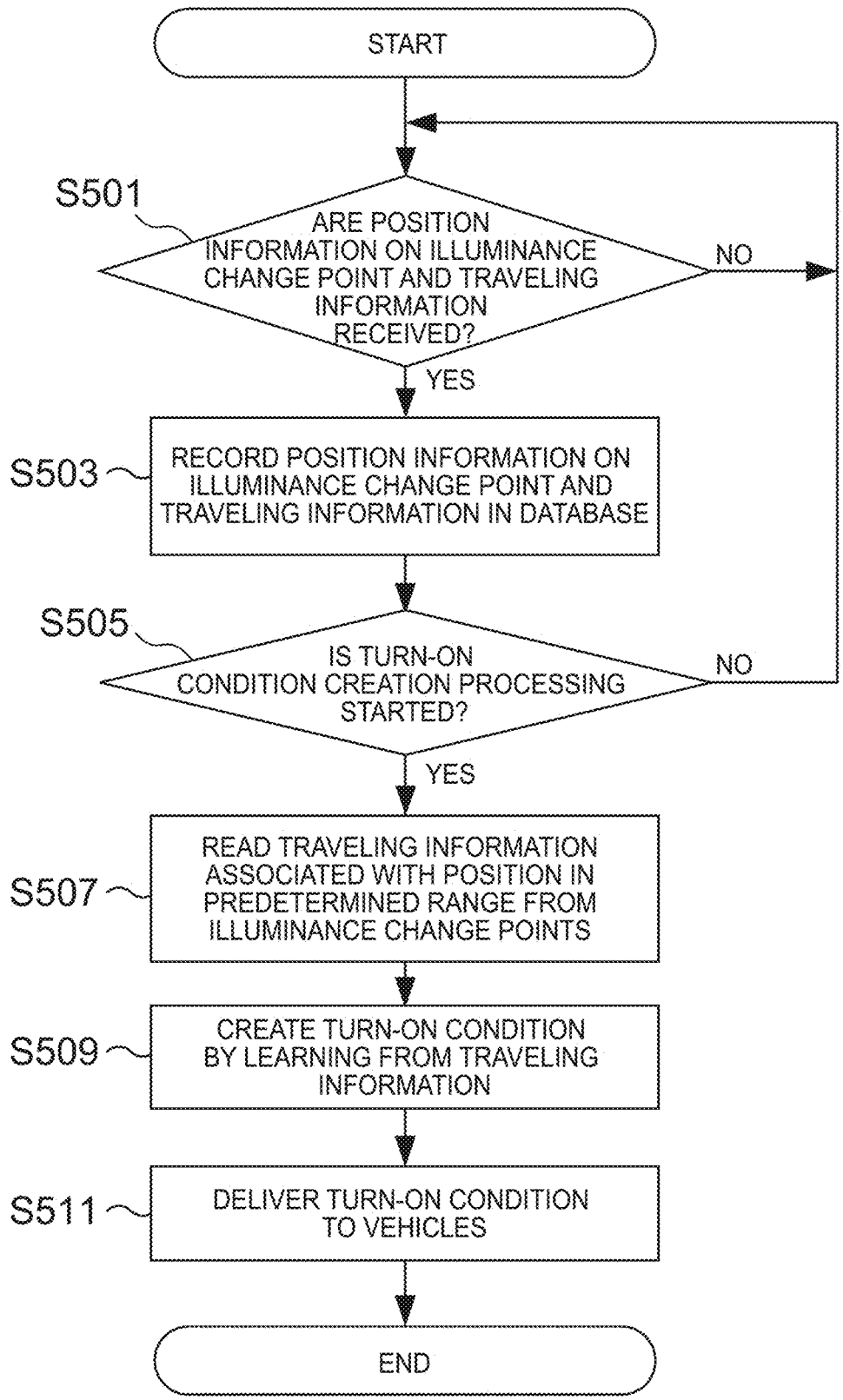
FIG. 5 is a flowchart showing a processing flow of the server shown in FIG. 3.
Figure 6:
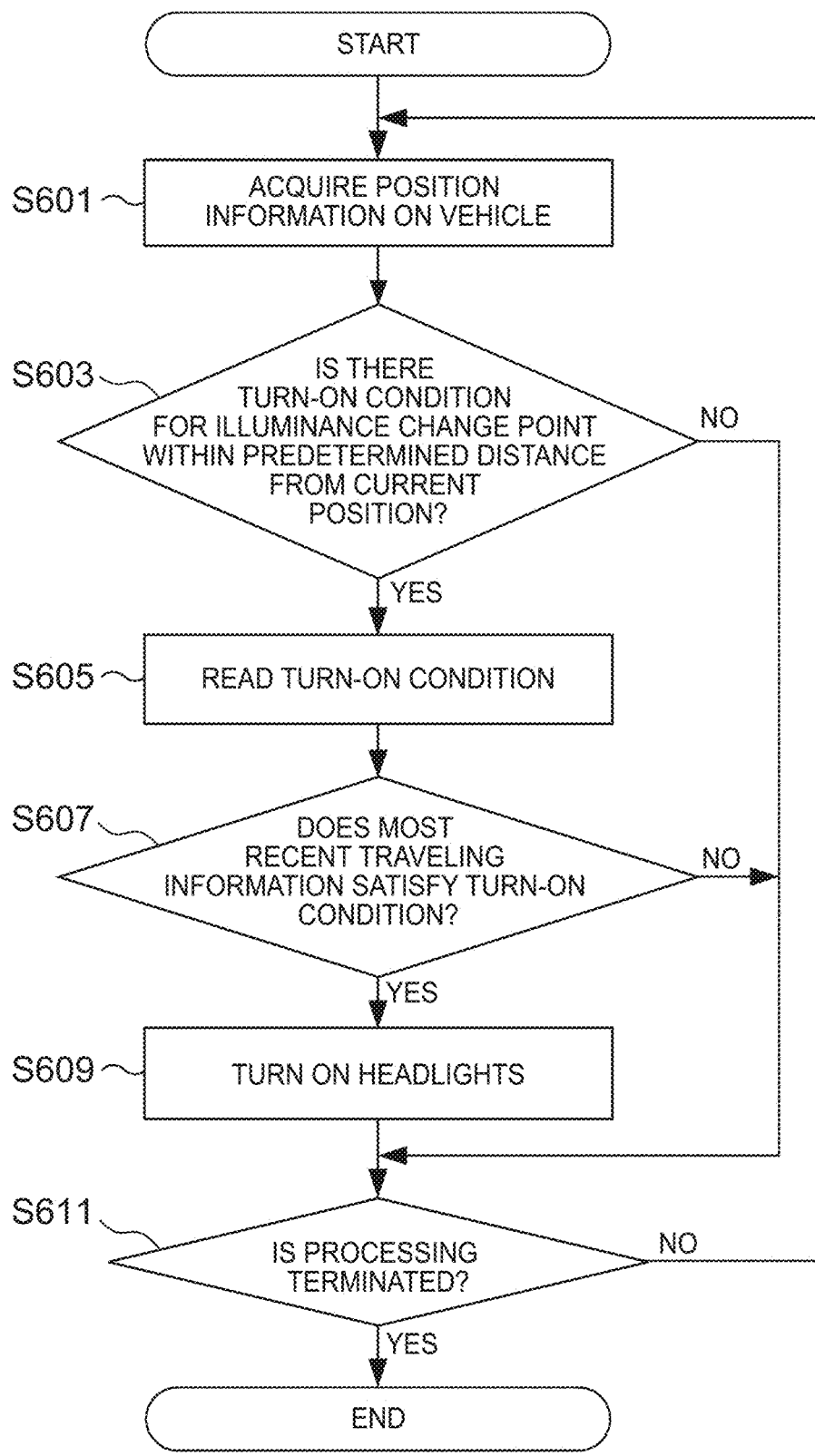
FIG. 6 is a flowchart showing a processing flow of the vehicle shown in FIG. 3.

The flow of processing of the vehicle system 1 will be described with reference to FIG. 4 to FIG. 6. FIG. 4 to FIG. 6 are flowcharts showing the processing flow of the vehicle 100 and the server 200 of the vehicle system 1.

The order of the processing steps that will be described below may be changed, or the processing steps may be executed in parallel, within a range not causing inconsistency in the processing contents. Another step may be added between the processing steps. In addition, a step described as one step for the sake of convenience may be divided into a plurality of steps, and a plurality of steps described separately for convenience sake of convenience may be executed as one step.

[3.1 Flow of Processing for Sending Traveling Information When Headlights are Turned On]

First, a flow of processing for sending the traveling information when the headlights are turned on after an illuminance change will be described with reference to FIG. 4.

When the vehicle 100 is started, the illuminance detection unit 101 starts detecting the illuminance around the vehicle 100 and the position detection unit 103 starts detecting the coordinate position of the vehicle 100, respectively (S401). In addition, the traveling information recording unit 105 starts recording the traveling information 119 on the vehicle 100 in the DB 117 (S403).

After that, when the illuminance detection unit 101 of the vehicle 100 detects an illuminance change from light to dark (Yes in S405), the position detection unit 103 acquires the position information on the illuminance change point (S407). In addition, the turn-on condition determination unit 115 determines whether the turn-on condition 121 that the dark state has continued for a predetermined time is satisfied (S409). If the dark state has continued for a predetermined time (Yes in S409), the turn-on condition determination unit 115 sends a notification to this effect to the turn-on control unit 107 to cause it to turn on the headlights (S411).

If the vehicle 100 has traveled for a predetermined time with the headlights turned on after the headlights were turned on (Yes in S413), the traveling information acquisition unit 109 reads, from the DB 117, the position information on the illuminance change point acquired in S407 and the traveling information 119 on a predetermined-distance range before the illuminance change point. Then, the turn-on time traveling information sending unit 111 sends the position information on the illuminance change point and the traveling information 119 collected before reaching the illuminance change point, which have been read, to the server 200 (S415). After that, when the illuminance change from dark to light is detected by the illuminance detection unit 101 (Yes in S417), the vehicle 100 repeats the processing in S405 and the subsequent steps. As a result, each time an illuminance change from light to dark is detected after the vehicle was started, the position information and the traveling information 119 are sent to the server 200.

On the other hand, if the dark state has not continued for a predetermined time in S409 (No in S409) or if the headlight turn-on state has not continued for a predetermined time in S413 (No in S413), and if the illuminance detection unit 101 detects the illuminance change from dark to light (Yes in S419), the vehicle 100 does not send the position information and the travel information to the server 200 and repeats the processing in S405 and the subsequent steps.

[3.2 Flow of Processing for Learning Turn-on Conditions]

Next, a flow of processing for learning the turn-on condition 211 will be described below with reference to FIG. 5. This processing is performed by the server 200 that has received the traveling information, collected before the headlights were turned on, from the vehicle 100.

If the position information on an illuminance change point, at which the headlights were turned on for a predetermined time or longer, and the traveling information collected before reaching the illuminance change point are received from the vehicle 100 (Yes in S501), the turn-on time traveling information receiving unit 201 records the received information in the DB 207 as the turn-on time traveling information 209 (S503). The turn-on time traveling information receiving unit 201 repeats this processing each time the similar information is received from the vehicle 100. As a result, a plurality of pieces of turn-on time traveling information 209 is accumulated in the DB 207.

The turn-on condition learning unit 203 starts the turn-on condition creation processing at an appropriate time (Yes in S505). When performing the turn-on condition creation processing, the turn-on condition learning unit 203 first reads, from the DB 207, the turn-on time traveling information 209 concerning the illuminance change point for which the turn-on condition is to be created. This turn-on time traveling information 209 is used as the learning data during the turn-on condition creation processing (S507). At this time, since the position information on the illuminance change point detected by the vehicle 100 may include an error, two or more illuminance change points whose coordinate position fall within a certain range can be treated as being the same illuminance change point.

The turn-on condition learning unit 203 learns from two or more pieces of turn-on time traveling information 209 on the illuminance change points, which can be regarded as the same illuminance change point, in order to learn a condition for the vehicle 100 to reach the illuminance change point (S509). Any learning method may be used. For example, one possible method is that, from among a plurality of pieces of turn-on time traveling information 209 associated with the same illuminance change point, the turn-on condition learning unit 203 extracts the traveling information that appears at a rate equal to or higher than a certain percentage. The turn-on condition learning unit 203 stores the learning result in the DB 207 as the turn-on condition 211 that is highly likely to occur before reaching the illuminance change point, that is, as the turn-on condition 211 for the headlights to be turned on. The turn-on condition sending unit 205 sends the turn-on condition 211, stored in the DB 207, to the vehicle 100 at an appropriate time (S511) to cause the turn-on condition update unit 113 of the vehicle 100 to update the turn-on condition 121 stored in the DB 117 of the vehicle 100.

[3.3 Flow of Processing for Turning on Headlights According to Learned Turn-on Conditions]

A flow of processing for turning on the headlights according to the turn-on condition 121 learned by the server 200 will be described below with reference to FIG. 6.

The position detection unit 103 of the vehicle 100 serially acquires the current position information on the host vehicle (S601). The turn-on condition determination unit 115 determines whether the DB 117 stores the turn-on condition 121 related to an illuminance change point within a predetermined distance from the current position of the host vehicle detected by the position detection unit 103 (S603). If the DB 117 stores the turn-on condition 121 for an illuminance change point within a predetermined distance from the current position (Yes in S603), the turn-on condition determination unit 115 reads the turn-on condition 121 (S605). From among the traveling information 119 recorded serially by the traveling information recording unit 105, the traveling information acquisition unit 109 reads the traveling information 119 that was recorded within the most recent predetermined period. Then, the turn-on condition determination unit 115 determines whether the most recent traveling information 119, which was read, satisfies the turn-on condition 121 (S607). If the most recent traveling information 119 satisfies the turn-on condition 121 (Yes in S607), the turn-on condition determination unit 115 sends a notification to this effect to the turn-on control unit 107 to cause it to turn on the headlights (S609). The vehicle 100 repeats the processing described above (No in S611) until the power is turned off and the processing is terminated.

[4 Hardware Configuration]

Figure 7:
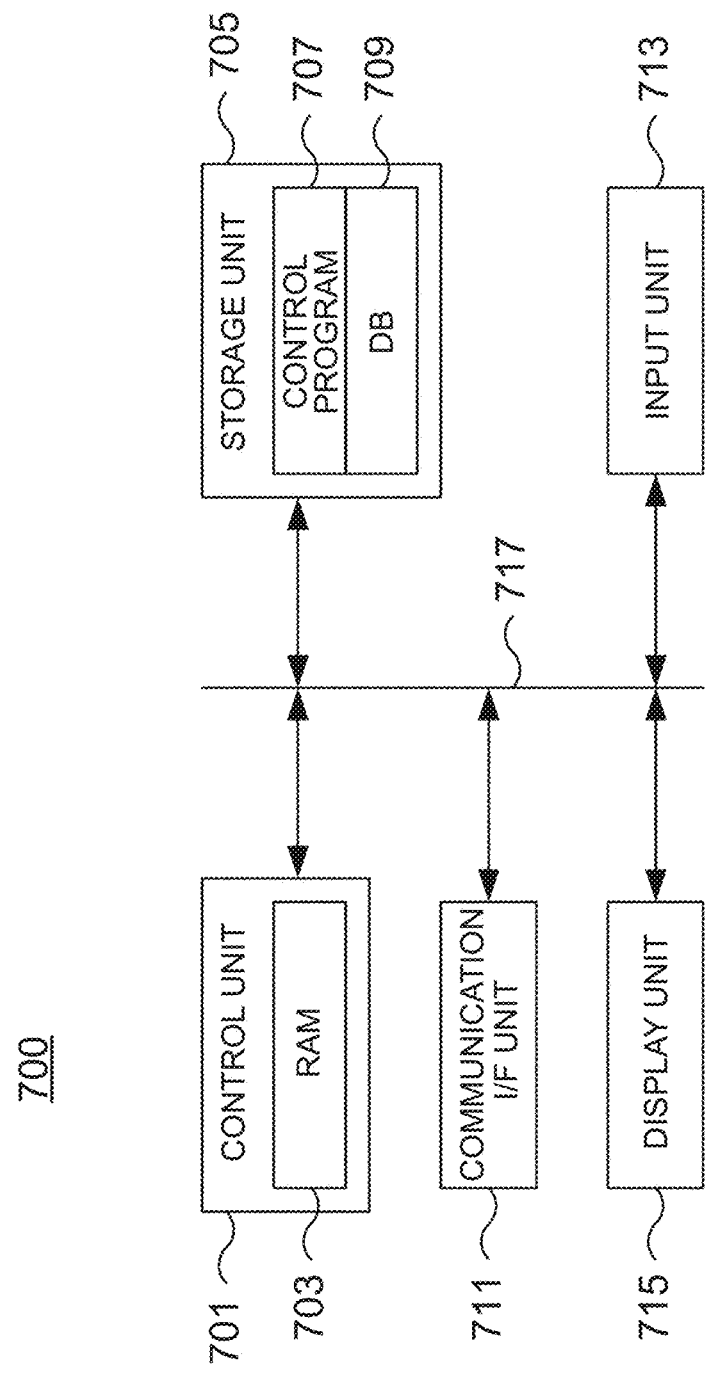
FIG. 7 is a diagram showing a specific example of a hardware configuration capable of implementing the vehicle or the server shown in FIG. 3.

A hardware configuration of a computer 700 that can implement the vehicle 100 and the server 200 will be described below with reference to FIG. 7. The computer 700 includes a control unit 701, a storage unit 705, a communication interface (I/F) unit 711, an input unit 713, and a display unit 715. These units are connected via a bus line 717.

The control unit 701 includes a Central Processing Unit (CPU) not shown, a Read Only Memory (ROM) not shown, and a Random Access Memory (RAM) 703. In addition to the function as a general computer, the control unit 701 is configured to execute a control program 707, stored in the storage unit 705, for performing the processing relating to the configuration of the vehicle 100 and the server 200 shown in FIG. 3. For example, the illuminance detection unit 101, position detection unit 103, traveling information recording unit 105, turn-on control unit 107, traveling information acquisition unit 109, turn-on time traveling information sending unit 111, and turn-on condition determination unit 115 of the vehicle 100, temporarily stored in the RAM 703, can be implemented as a control program 707 operating on the CPU. The same is true for the turn-on time traveling information receiving unit 201, turn-on condition learning unit 203, and turn-on condition sending unit 205 of the server 200.

The RAM 703 temporarily stores code of the control program 707 and a part or the whole of the information included in a DB 709. The RAM 703 is also used as a work area when the CPU performs various processing.

The storage unit 705 is a nonvolatile storage medium such as a Hard Disk Drive (HDD) or a flash memory. The storage unit 705 stores the operating system (OS) for implementing the function as a general computer and the control program 707 that is an application program. In addition, the storage unit 705 stores the DB 709 corresponding to the DB 117 when the computer 700 is used to implement the vehicle 100, and stores the DB 709 corresponding to the DB 207 when the computer 700 is used to implement the server 200.

The communication I/F unit 711 is a device for communicating data between the vehicle 100 and the server 200 as necessary. Any communication method may be used between the vehicle 100 and the server 200. For example, a public telephone network, the Internet, or a combination of them may be used.

The input unit 713 is a device for accepting an input operation from a user. Specific examples of the input unit 713 include various buttons, a touch panel, a microphone, and so on.

The display unit 715 is a display device for presenting various information to a user who operates the computer 700. Specific examples of the display unit 715 include a liquid crystal display, an organic Electro-Luminescence (EL) display, and so on.

[5 Effects of this Embodiment]

As described above, the vehicle system 1 according to the this embodiment collects, and learns from, the information on a point where the illuminance greatly changes and the traveling information on a range immediately before that point. This makes it possible for the vehicle 100 to automatically turn on the headlights according to the turn-on condition 121 that is the learning result. This ability allows the vehicle 100 to suitably turn on the headlights at a point before the illuminance changes.

<6 Others>

The above described embodiment is intended to help understand the present disclosure and is not intended to limit the present disclosure. The components of the embodiment, and the arrangement, materials, conditions, shapes, and sizes of the components are not limited to those illustrated, but can be appropriately changed. In addition, the configurations shown in different embodiments may be replaced or combined in part.

In the present disclosure, a "part", a "unit", a "device", or a "system" does not simply mean a physical unit, but also includes the software-implemented function of the "part", "unit", "device", or "system". In addition, the function of one "part", "unit", "device", or "system" may be implemented by two or more physical units or devices; conversely, the function of two or more "parts", "units", "devices", or "systems" may be implemented by one physical unit or device.

What is claimed is:

1. A vehicle system, comprising:
an information processing device and
a vehicle including:
a computer having a processor for executing programs stored in memory, the computer configured to:
detect an illuminance change on a periphery of the vehicle;
acquire position information of the vehicle;
send (i) illuminance change position information and (ii) traveling information when a headlight of the vehicle has been turned on for a predetermined time after the illuminance change, the illuminance change position information being information on a position where the illuminance change is detected, the traveling information indicating a traveling state of the vehicle before the vehicle reaches the position where the illuminance change is detected;

receive a turn-on condition, the turn-on condition being a condition for turning on the headlight; and turn on the headlight according to the traveling information and the turn-on condition, wherein the computer is further configured to:

receive, from the vehicle, (i) the illuminance change position information and (ii) the traveling information, learn, as the turn-on condition, traveling content of the vehicle before the vehicle reaches the position where the illuminance change is detected, by using the travelling information, the traveling information being associated with the position where the illuminance change is detected within a predetermined range and send the turn-on condition to the vehicle.

2. The vehicle system according to claim 1, wherein the computer is configured to send, to the information processing device, the traveling information on a predetermined-distance range before the position where the illuminance change is detected, the traveling information being associated with the illuminance change position information.

3. The vehicle system of claim 1, wherein the traveling information includes traveling state of the vehicle.

4. The vehicle system of claim 3, wherein the traveling state of the vehicle includes at least one of information on coordinates of the vehicle, travel link ID of the vehicle, matching state of the vehicle, current time, distance from the position where the illuminance change is detected, vehicle speed of the vehicle, yaw rate of the vehicle, and vertical gravitational acceleration information of the vehicle.

5. A vehicle comprising:

a computer having a processor for executing programs stored in memory, the computer configured to:

detect an illuminance change on a periphery of the vehicle;

acquire position information of the vehicle;

send (i) illuminance change position information and (ii) traveling information when a headlight of the vehicle has been turned on for a predetermined time after the illuminance change, the illuminance change position information being information on a position where the illuminance change is detected, the traveling information indicating a traveling state of the vehicle before the vehicle reaches the position where the illuminance change is detected;

receive a turn-on condition, the turn-on condition being a condition for turning on the headlight; and turn on the headlight according to the traveling information and the turn-on condition.

6. The vehicle according to claim 5, wherein the computer is further configured to send the traveling information on a predetermined-distance range before the position where the illuminance change is detected, the traveling information being associated with the illuminance change position information.

7. The vehicle system of claim 5, wherein the traveling information includes traveling state of the vehicle.

8. The vehicle system of claim 7, wherein the traveling state of the vehicle includes at least one of information on coordinates of the vehicle, travel link ID of the vehicle, matching state of the vehicle, current time, distance from the position where the illuminance change is detected, vehicle speed of the vehicle, yaw rate of the vehicle, and vertical gravitational acceleration information of the vehicle.

9. An information processing device comprising:

a computer having a processor for executing programs stored in memory, the computer configured to:

receive, from a vehicle, (i) illuminance change position information and (ii) traveling information of the vehicle, the illuminance change position information being information on a position where an illuminance change on a periphery of the vehicle is detected, the traveling information indicating a traveling state of the vehicle before the vehicle reaches the position where the illuminance change is detected;

learn, as a turn-on condition, traveling content before the vehicle reaches the position where the illuminance change is detected, by using the travelling information, the turn-on condition being a condition for the vehicle to turn on a headlight of the vehicle, the traveling information being associated with the position where the illuminance change is detected within a predetermined range; and send the turn-on condition to the vehicle.

10. The information processing device of claim 9, wherein the traveling information includes traveling state of the vehicle.

11. The information processing device of claim 10, wherein the traveling state of the vehicle includes at least one of information on coordinates of the vehicle, travel link ID of the vehicle, matching state of the vehicle, current time, distance from the position where the illuminance change is detected, vehicle speed of the vehicle, yaw rate of the vehicle, and vertical gravitational acceleration information of the vehicle.

* * * * *